(12) United States Patent
Chang

(10) Patent No.: US 8,469,644 B2
(45) Date of Patent: Jun. 25, 2013

(54) STEM FASTENING STRUCTURE

(76) Inventor: Shih-Chieh Chang, Taichung (TW)

( * ) Notice: Subject to any disclaimer, the term of this patent is extended or adjusted under 35 U.S.C. 154(b) by 308 days.

(21) Appl. No.: 13/076,004

(22) Filed: Mar. 30, 2011

(65) Prior Publication Data

US 2011/0243684 A1 Oct. 6, 2011

(30) Foreign Application Priority Data

Apr. 6, 2010 (TW) ................................ 99206017 U

(51) Int. Cl.
*F16B 13/04* (2006.01)
(52) U.S. Cl.
USPC .............. 411/34; 411/32; 411/80.1; 411/363; 411/502
(58) Field of Classification Search
USPC ............... 411/24, 32, 34, 44, 60.3, 80.1, 360, 411/363, 430, 502, 15, 33, 81, 191
See application file for complete search history.

(56) References Cited

U.S. PATENT DOCUMENTS

| | | | | |
|---|---|---|---|---|
| 3,505,921 A | * | 4/1970 | Wigam | 411/34 |
| 3,698,279 A | * | 10/1972 | Mallet | 411/34 |
| 4,036,098 A | * | 7/1977 | Schruff | 411/34 |
| 4,197,781 A | * | 4/1980 | Giannuzzi | 411/341 |
| 4,309,136 A | * | 1/1982 | Talan | 411/36 |
| 4,659,269 A | * | 4/1987 | Stromiedel | 411/34 |
| 6,746,191 B2 | * | 6/2004 | Edland | 411/34 |
| 6,835,038 B2 | * | 12/2004 | Benito-Navazo | 411/80.1 |
| 2003/0053881 A1 | * | 3/2003 | Huang et al. | 411/34 |
| 2004/0067121 A1 | * | 4/2004 | Huang et al. | 411/32 |

* cited by examiner

*Primary Examiner* — Roberta Delisle

(57) ABSTRACT

A stem fastening structure includes a cap, a bolt and a packing member. The cap abuts against a top of a stem and corresponds to a top edge of a middle hole of a front fork. The bolt passes through the cap and penetrates into the middle hole. The packing member has a loop portion for the bolt screwing therethrough. Two sides of the loop portion extend upward and diverge from the other to form two bottom cone portions. Two positioning portions respectively and vertically extend upward from the two positioning portioning. Two top cone portions respectively extend upward from the two positioning portions, and approach the other. A top of each top cone portions abuts against the cap. Thereby, when the bolt drives the loop portion to move toward the cap, the positioning portions abut against the middle hole, so that the stem is fastened to the front fork.

4 Claims, 12 Drawing Sheets

STEM FASTENING STRUCTURE

BACKGROUND OF THE INVENTION

1. Field of the Invention

The present invention relates to a fastening structure, which can fasten a bicycle stem to a bicycle front fork.

2. Description of the Prior Art

Please refer to FIG. 1. The inner hole (11) of the bicycle stem (10) is used for a front fork inserting therein, so that the bottom of the stem (10) abuts against the rib ring (21) of the front fork (20), and the top of the stem (10) protrudes from the front fork (20). The front fork (20) which has a middle hole (22) can be fixed to the stem (10) with a fastening structure.

The fastening structure comprises a cap (30), a bolt (40), a nut (50) and a packing ring (60). The cap has a pillar (31) corresponding to the top edge of the middle hole (22) of the front fork (20), a ring shoulder (32) abutting against the top end of the stem (10), and a head hole (33) passing though the cap (30). The bolt (40) has a bolt head (41) corresponding to the head hole (33), a bolt rod (42) penetrating into the middle hole (22) of the front fork (20). The nut (50) is located in the middle hole (22) of the front fork (20), and its top edge is formed with a shoulder portion (51). A through threaded hole (52) is formed in a central position of the nut (50). The packing ring (60) is adapted for the bolt rod (42) penetrating therethrough, so the packing ring (60) is limited between the cap (30) and the nut (50). The packing ring (60) has a circle portion (61) which can be positioned to the shoulder portion (51). Two opposite sides of the circle portion (61) extends upward to form two bottom cone portions (62), and an interval between the two bottom cone portions (62) is gradually enlarged from the circle portion (61). A top end of each bottom cone portion (62) extends upward so as to form a positioning portion (63), and an interval between the two positioning portions (63) is constant. A top end of each positioning portions (63) extends upward so as to form a top cone portion (64), and an interval between the two top cone portions (64) is gradually contracted from the two positioning portion (63), so that a top end of each top cone portion abuts against a bottom of the cap (30).

Thereby, when screwing the bolt (40) to drive the nut (50) to move toward the cap (30), the nut (50) can press against the packing ring (60) so as to make the positioning portion (63) expand outwards to tightly fit the middle hole (22) of the front fork (20). Consequently, the stem (10) can be fastened to the front fork (20).

However, said fastening structure has the following disadvantages. At first, it comprises too many components, so the production cost is high. In addition, the nut (50) and the packing ring (60) are separated components instead of a modular component which can be formed as one unit. As a result, it is inefficient to assemble the nut (50) and the packing ring (60), and those components are prone to be lost when disassembling the structure. Further, when screwing the bolt, the packing ring (60) may rotate with respect to the nut (50), so that positioning portion (43) may fail to tightly fit the middle hole (22) of the front fork (20).

The present invention is, therefore, arisen to obviate or at least mitigate the above mentioned disadvantages.

SUMMARY OF THE INVENTION

The main object of the present invention is to provide a stem fastening structure. The stem fastening structure combines a nut and a packing ring to form as a packing member, so that the fastening structure simplifies its components and is easy to be assembled. In addition, the packing member can tightly fit the middle hole of a front fork, so a stem can be firmly fastened to the front fork without looseness.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
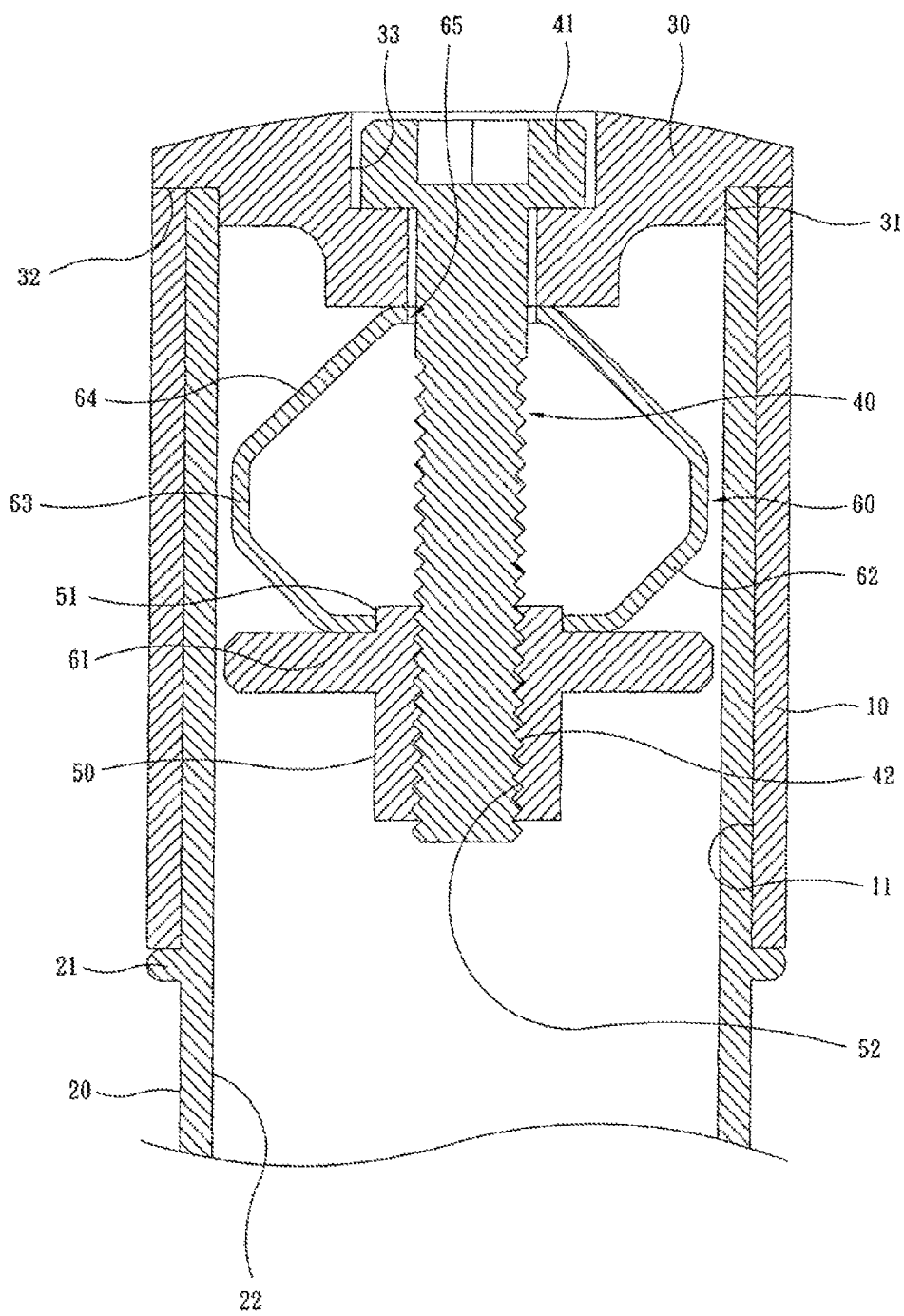
FIG. 1 is a cross-sectional drawing showing a conventional stem fastening structure.
Figure 2:
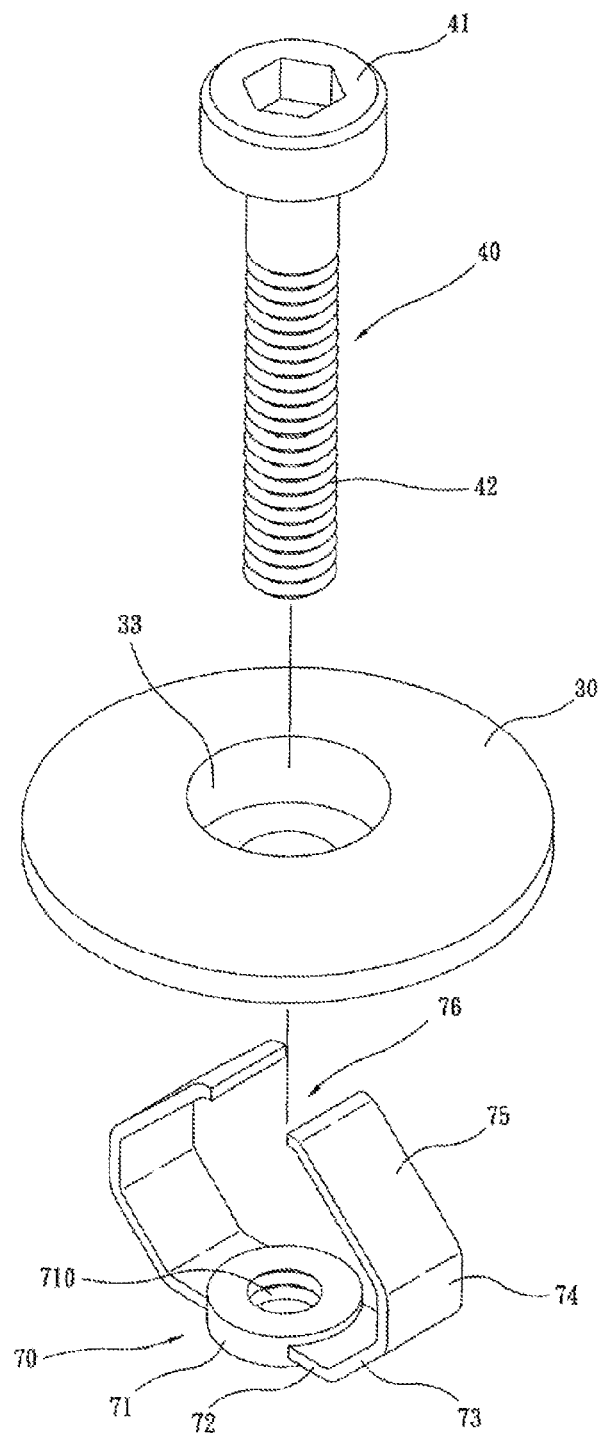
FIG. 2 is a breakdown drawing showing a first preferred embodiment of the present invention.
Figure 3A:
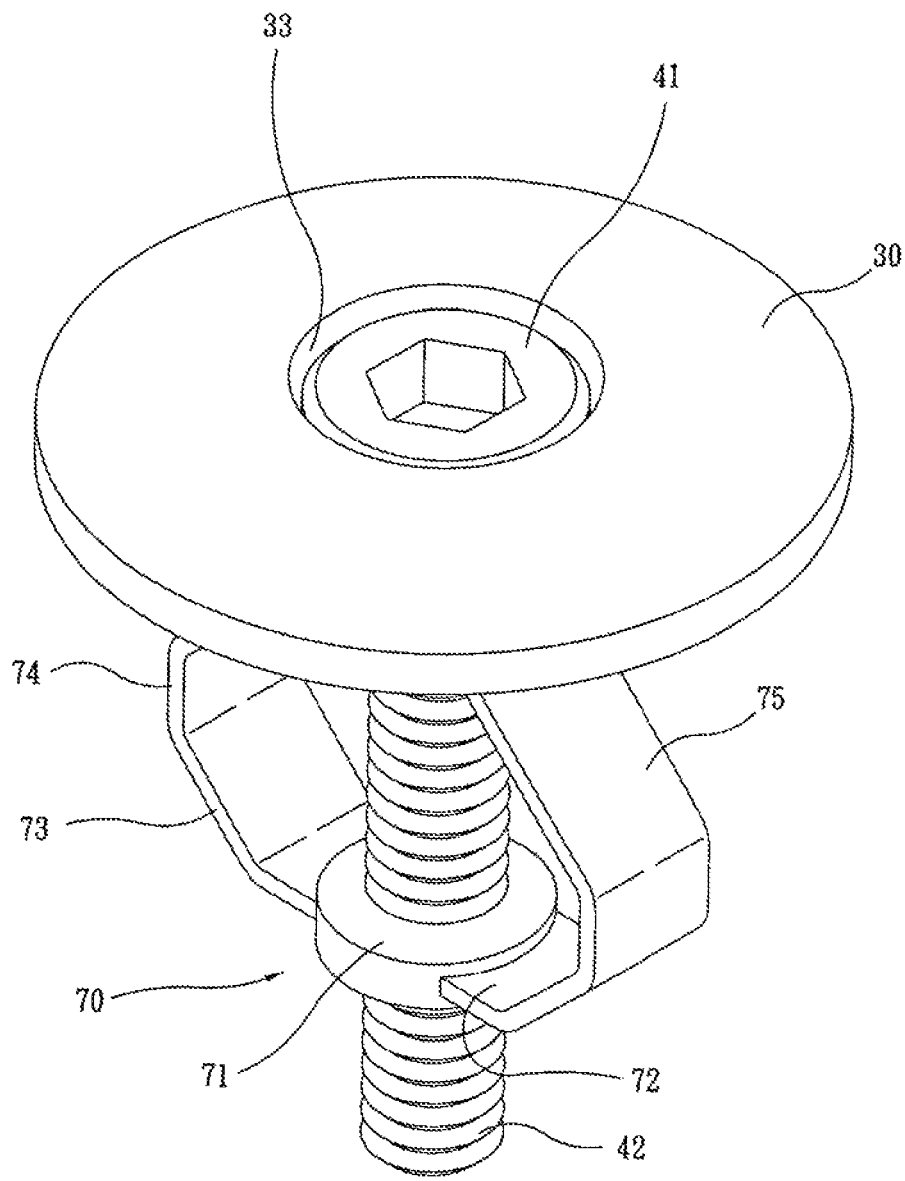
FIG. 3A is a stereogram showing a first preferred embodiment of the present invention.
Figure 3B:
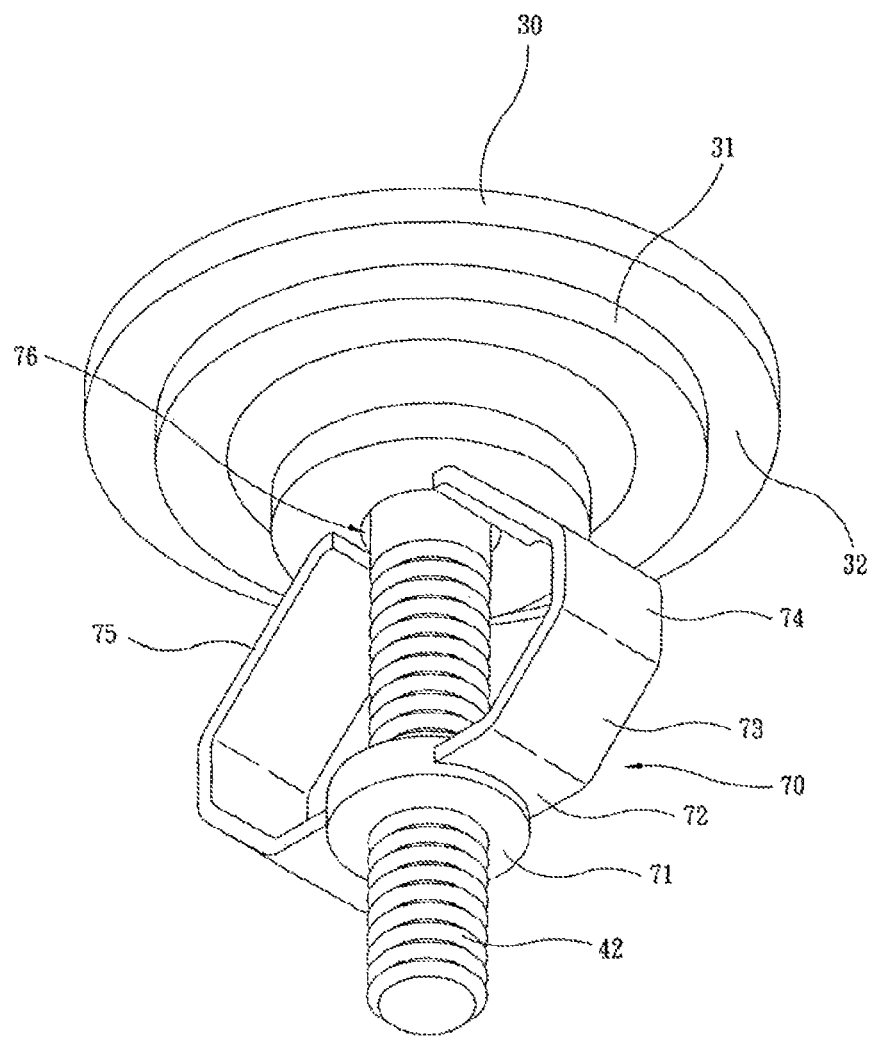
FIG. 3B is another stereogram showing a first preferred embodiment of the present invention.
Figure 4A:
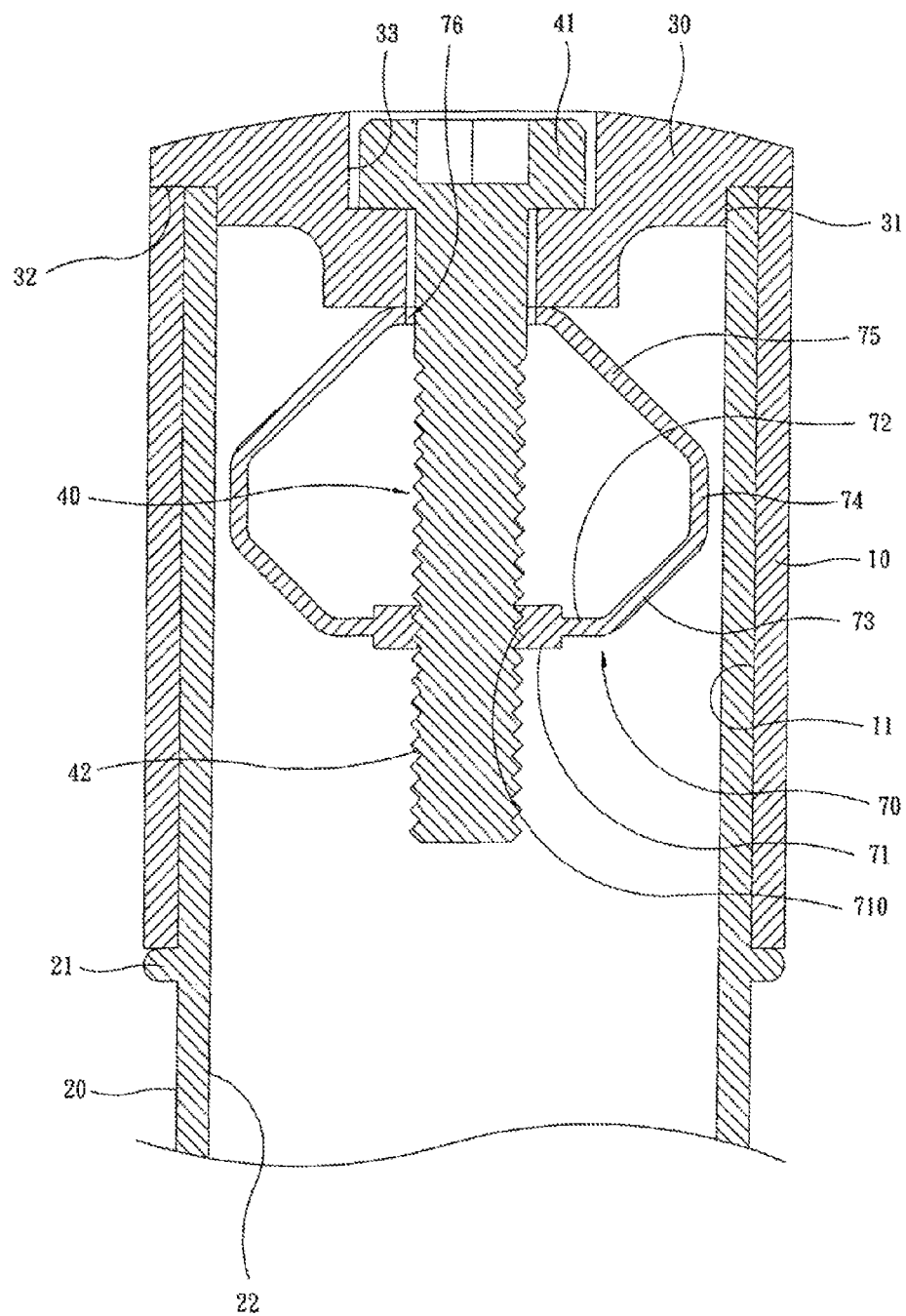
FIGS. 4A and 4B are schematic drawings showing a first preferred embodiment of the present invention, wherein a stem is fastened to a front fork with the first embodiment.
Figure 4B:
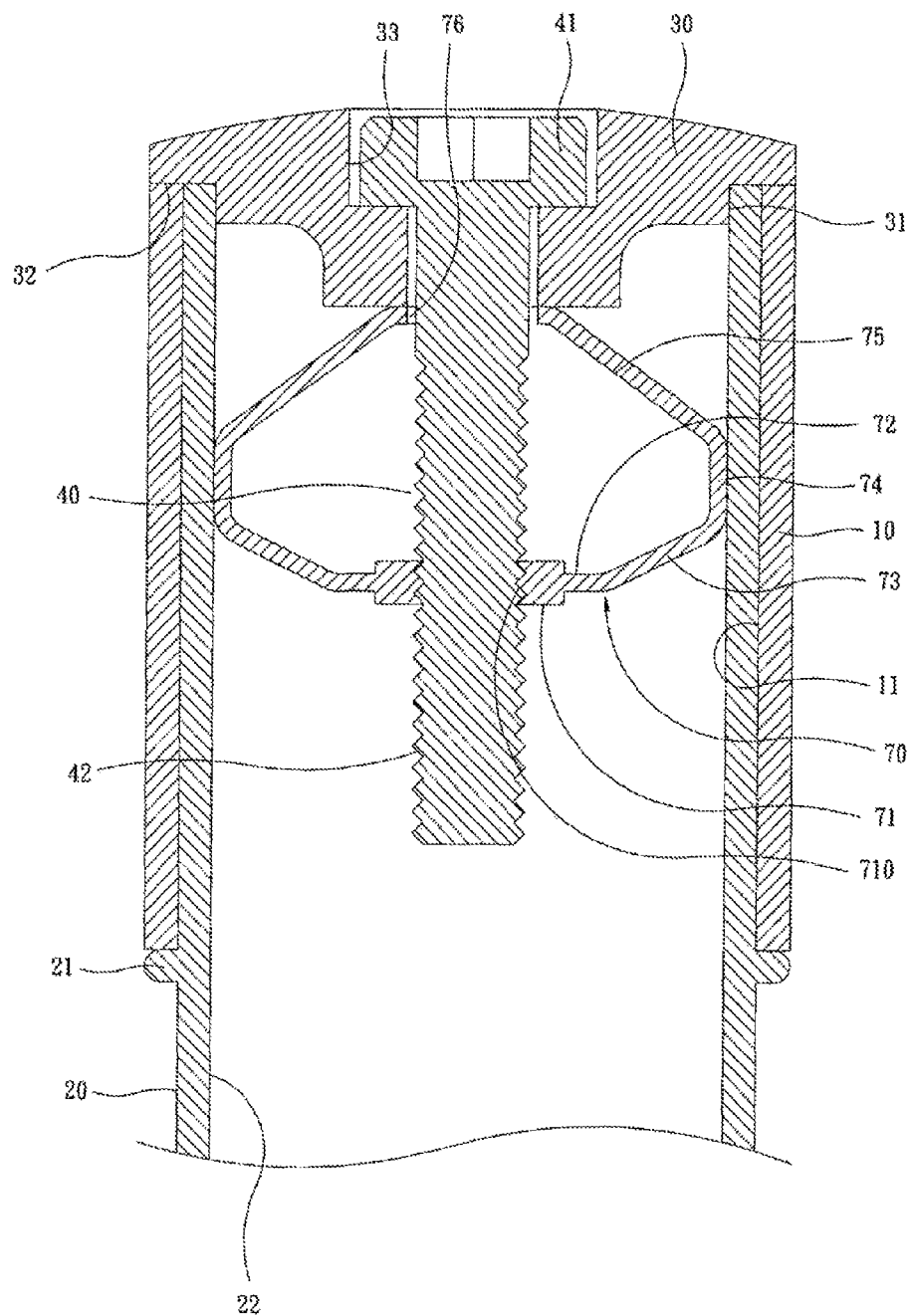
Figure 5:
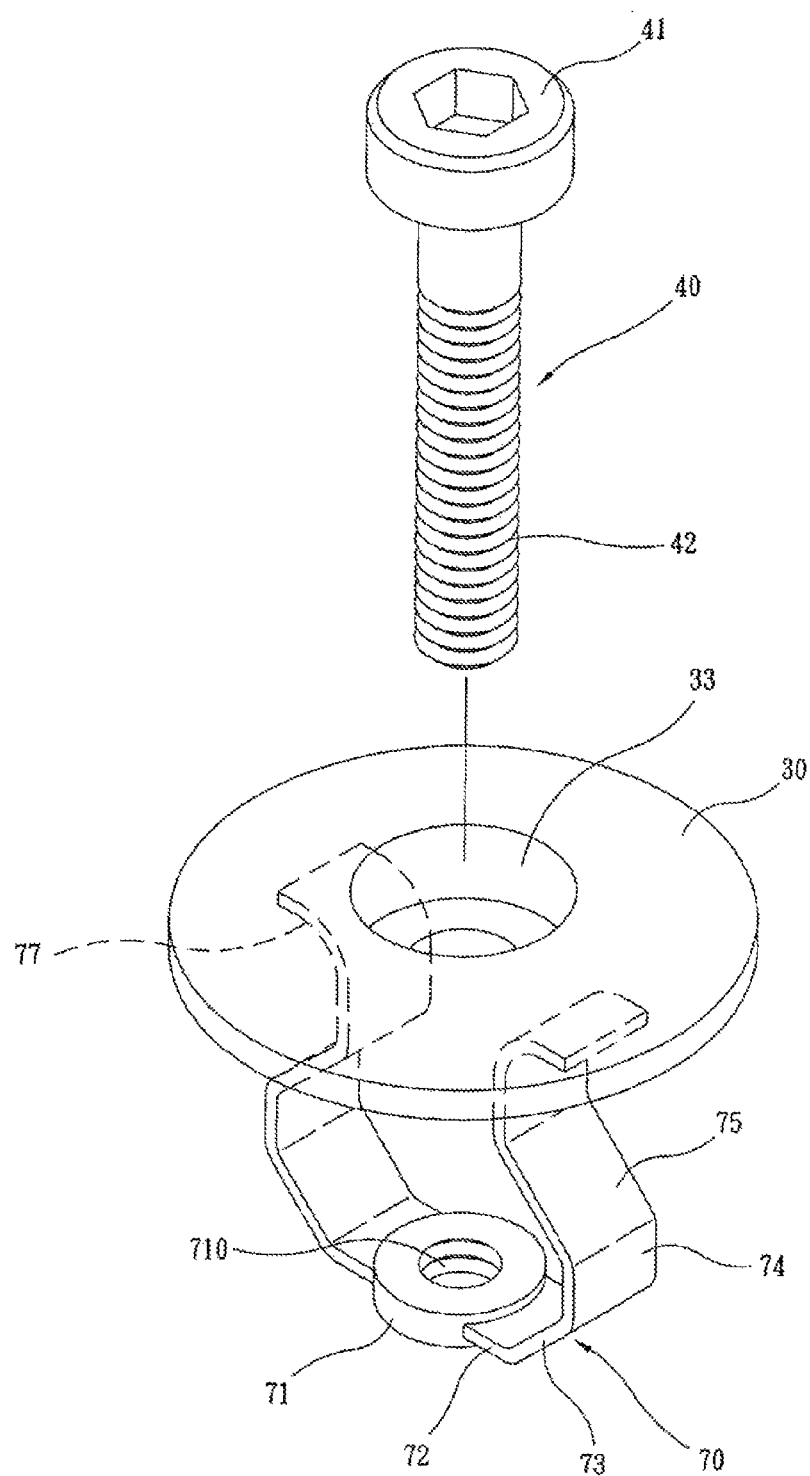
FIG. 5 is a breakdown drawing showing a second preferred embodiment of the present invention.
Figure 6:
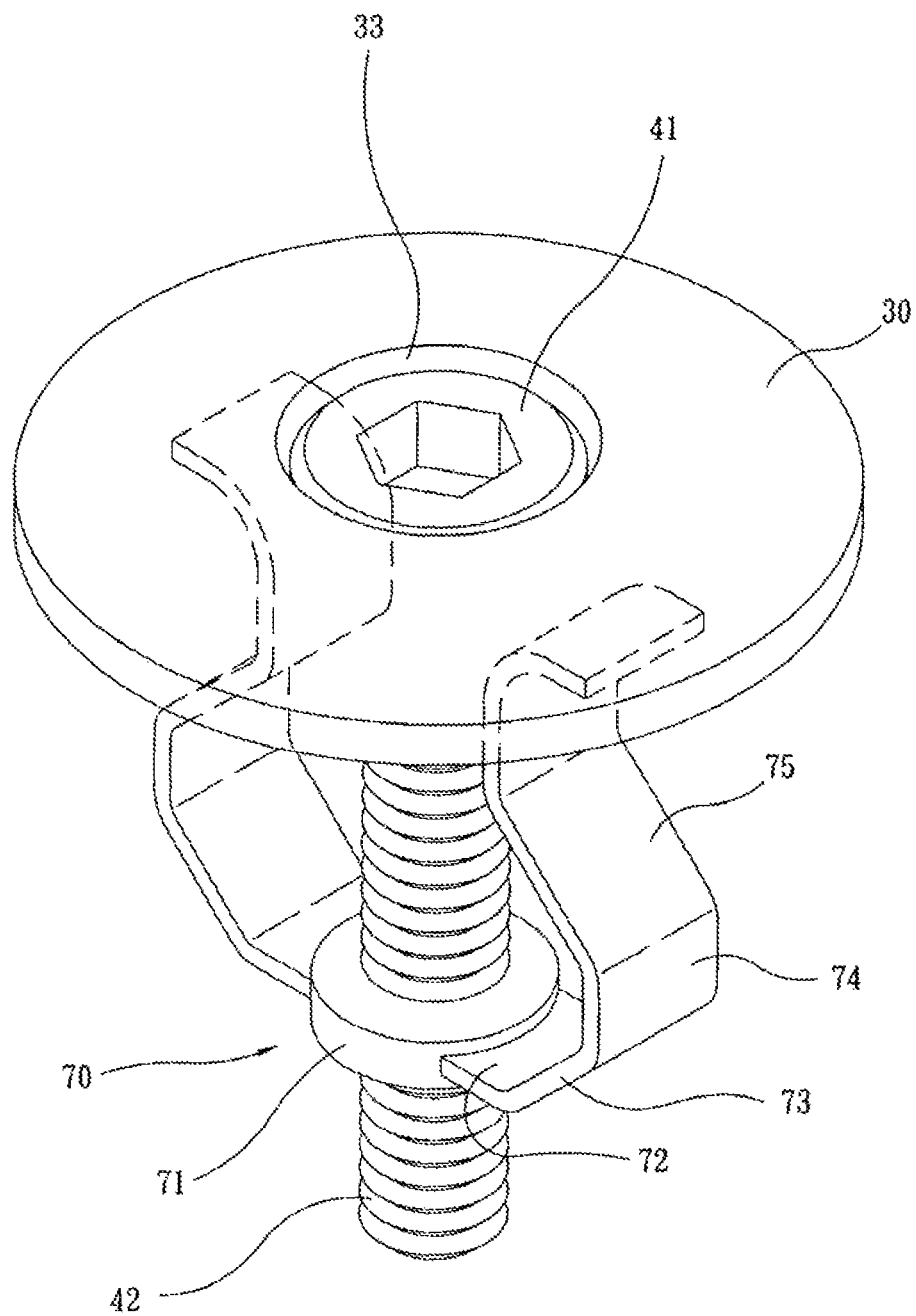
FIG. 6 is a stereogram showing a second preferred embodiment of the present invention.
Figure 7A:
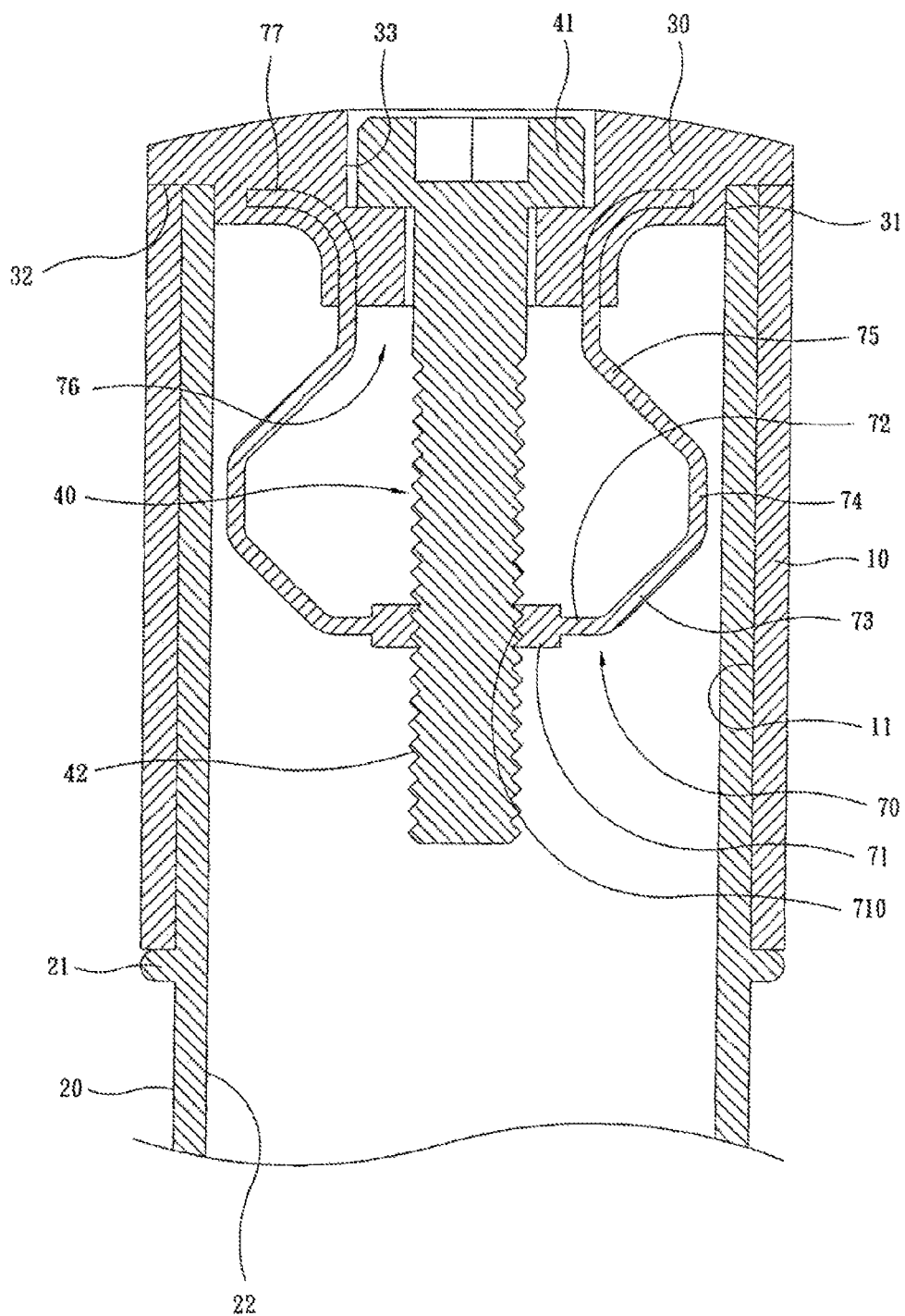
FIGS. 7A and 7B are the schematic drawings showing a second preferred embodiment of the present invention, wherein a stem is fastened to a front fork with the second embodiment.
Figure 7B:
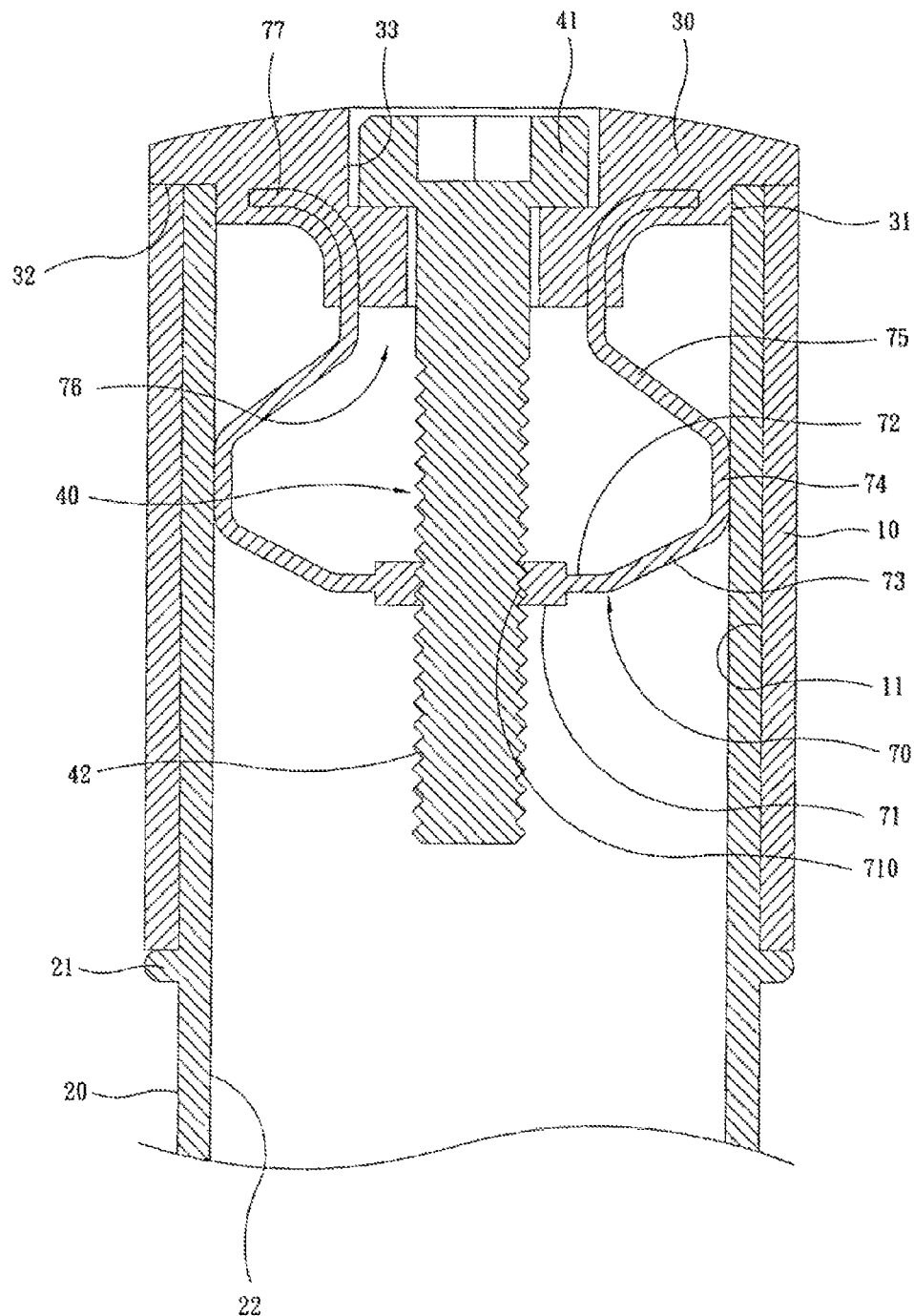

Please refer to FIGS. 2, 3A, 3B, 4A and 4B. The present invention includes a cap (30), a bolt (40), and a packing member (70).

The cap (30) has a pillar (31) corresponding to a top edge of a middle hole (22) of a front fork (20), a ring shoulder (32) abutting against a top end of a stem (10), and a head hole (33) passing through the cap (30).

The bolt (40) has a bolt head (41) corresponding to the head hole (33) so as to be located therein, and a bolt rod (42) penetrating into the middle hole (22) of the front fork (20);

The packing member (70) is received in the middle hole (22) of the front fork (20). The packing member (70) has a loop portion (71), and the loop portion (71) is formed with a through threaded hole (710) for receiving the bolt rod (42) therein. Two peripheral sides of the loop portion (71) horizontally extend outwards to form as two wing portions (72). The distal end of each wing portion (72) extends upward to from as a bottom cone portion (73), and an interval between the two bottom cone portions (73) is gradually enlarged from the loop portion (71). A top end of each bottom cone portion (73) extends upward to form a positioning portion (74), and an interval between the two positioning portions being constant. A top end of each positioning portion (74) extends upward to form a top cone portion (75), and an interval between the two top cone portions (75) is gradually contracted from the two positioning portions (74). A top end of the two top cone portions (75) defines an opening (76) for the bolt rod (42) passing therethrough, and the top end of the two top cone portions (75) abuts against a bottom of the cap (30).

When screwing the bolt (40) to drive the loop portion (71) of the packing member (70) to threadably move toward the cap (30), the top cone portions (75) and the bottom cone portions (73) are pressed to make the positioning portions (74) expand outwards. Thereby, the positioning portions (74) can tightly fit the middle hole (22) of the front fork (20). As a result, the stem (10) is fastened to the front fork (20) so as to form as a unit.

In light of the above description, the present invention has at least the following advantages. In the first place, the present invention simplifies the conventional structure from three components into two components, as such the production cost can be reduced. Moreover, the present invention combines a nut and a packing ring into a modular structure, so it can increase the efficiency for assembly and decrease the possibility of losing components when disassembling the structure. Furthermore, when the bolt (40) is being screwed, the positioning portions (74) rotate and then rotary cut into the middle hole (22) of the front fork (20). So the applied force of positioning portions (74) abutting against the front fork (20) is enhanced.

Please refer to FIGS. 5, 6, 7A and 7B for the second preferred embodiment of the present invention. The top end of each top cone portion (75) is further formed with an outward arcuate shaped connecting portion (77). The two connecting portions (77) are adapted to be wrapped by the cap as the cap is being molded. The cap (30) and the packing member (70) then are combined into one unit so as to have the better modulation effect.

Figure 8:
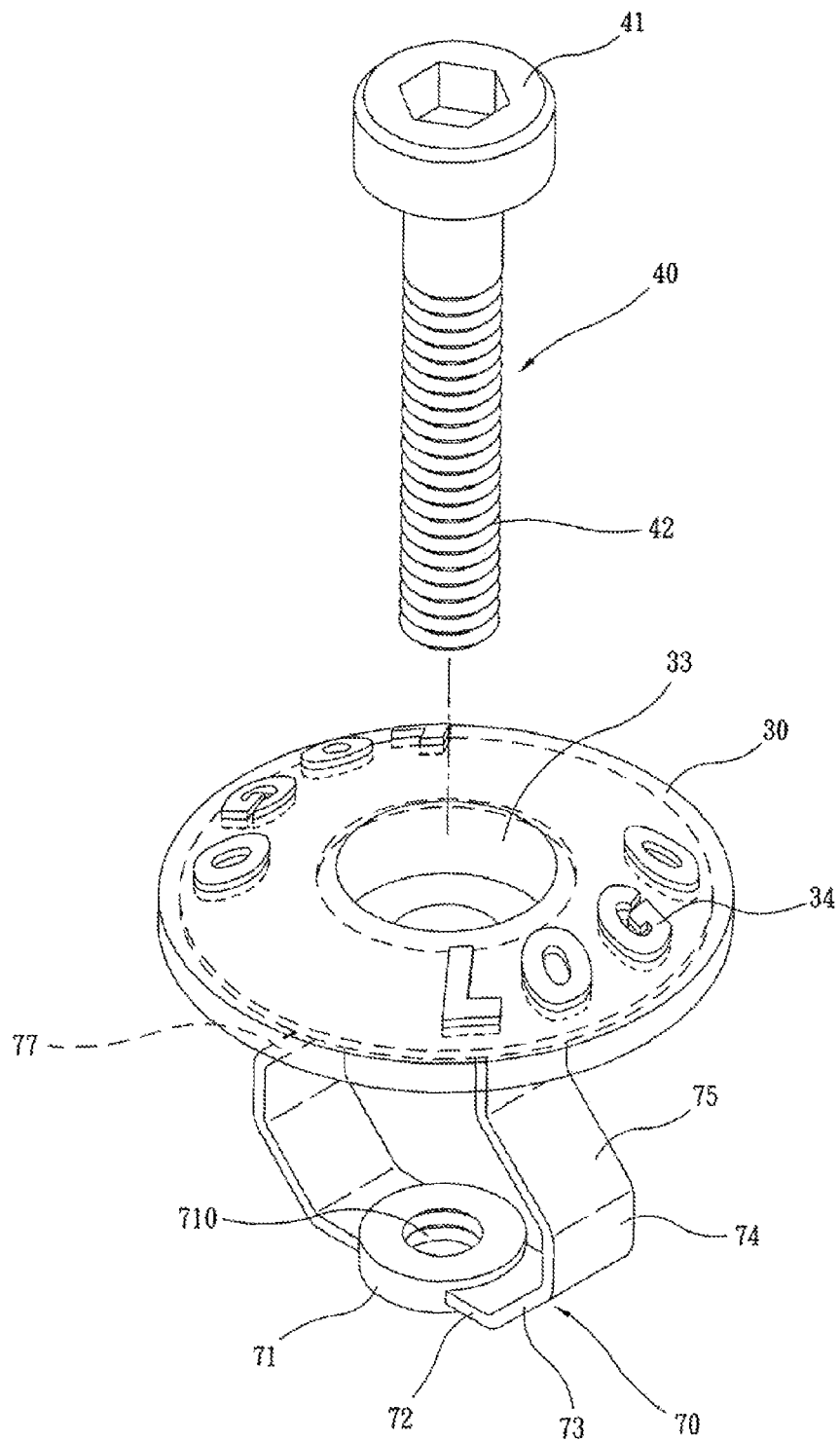
FIG. 8 is the breakdown drawing showing a third preferred embodiment of the present invention.
Figure 9:
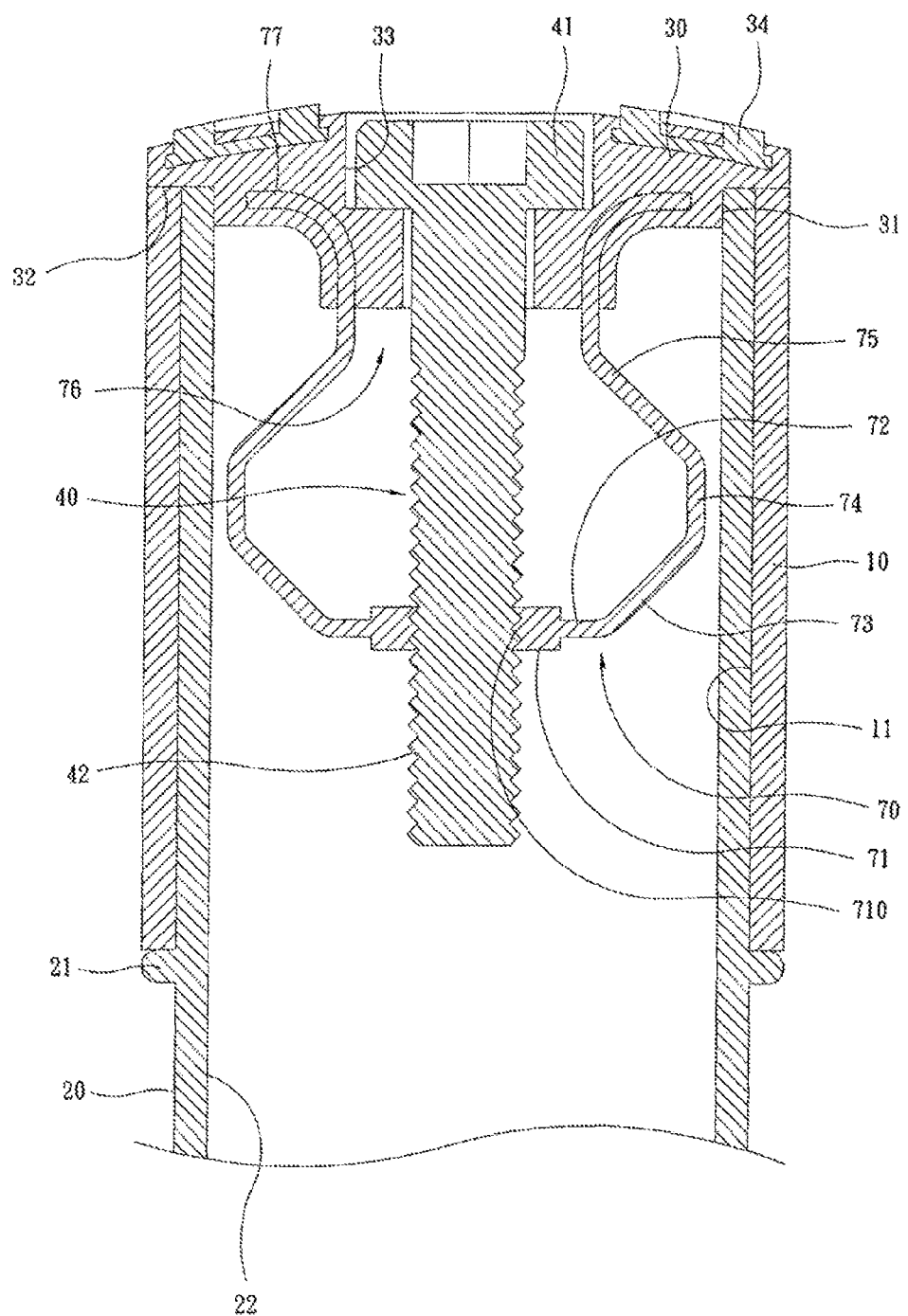
FIG. 9 is the cross-sectional drawing showing a third preferred embodiment of the present invention.

Please refer to FIGS. 8 and 9 for the third preferred embodiment of the present invention. In this embodiment, when the cap (30) is being molded by plastics, a block (34) is embedded and joined to the cap, so that the block protrudes from a top surface of the cap and then form as a logo or a pattern to mark the fastening structure.

According to the above description, the present invention is novel and can improve the disadvantages of the conventional structure. While the above embodiments of the present invention and their advantages have been described in detail, it should be understood that various changes, substitutions, and alternations may be made herein without departing from the scope of the invention.

What is claimed is:

1. A stem fastening structure, comprising:

a cap, having a pillar corresponding to a top edge of a middle hole of a front fork, a ring shoulder abutting against a top end of a stem, and a head hole passing through the cap;

a bolt, having a bolt head corresponding to the head hole so as to be located therein, and a bolt rod penetrating into the middle hole of the front fork;

a packing member, received in the middle hole of the front fork, the packing member having a loop portion, the loop portion being formed with a through threaded hole for receiving the bolt rod therein, two wing portions horizontally extending outward from two peripheral sides of the loop portion, two bottom cone portions extending upward from distal ends of the wing portions, an interval between the two bottom cone portions being gradually enlarged from the loop portion, a top end of each bottom cone portion extending upward to form a positioning portion, an interval between the two positioning portions being constant, a top end of each positioning portion extending upward to form a top cone portion, an interval between the two top cone portions being gradually contracted from the two positioning portions, a top end of the two top cone portions defining an opening for the bolt rod passing therethrough, the top end of the two top cone portions abutting against a bottom of the cap.

2. A stem fastening structure, comprising:

a cap, having a pillar corresponding to a top edge of a middle hole of a front fork, a ring shoulder abutting against a top end of a stem, and a head hole passing through the cap;

a bolt, having a bolt head corresponding to the head hole so as to be located therein, and a bolt rod penetrating into the middle hole of the front fork;

a packing member, received in the middle hole of the front fork, the packing member having a loop portion, the loop portion being formed with a through threaded hole for receiving the bolt rod therein, two wing portions horizontally extending outward from two peripheral sides of the loop portion, two bottom cone portions extending upward from distal ends of the wing portions, an interval between the two bottom cone portions being gradually enlarged from the loop portion, a top end of each bottom cone portion extending upward to form a positioning portion, an interval between the two positioning portions being constant, a top end of each positioning portion extending upward to form a top cone portion, an interval between the two top cone portions being gradually contracted from the two positioning portions, a top end of the two top cone portions defining an opening for the bolt rod passing therethrough, the top end of each top cone portion being formed with a connecting portion, the connecting portions being adapted to be wrapped by the cap as the cap is being molded.

3. The stem fastening structure of claim 2, wherein the connecting portions are respectively formed in an outward arcuate shape.

4. The stem fastening structure of claim 2, wherein when the cap is being molded by plastics, a block is embedded and joined to the cap, so that the block protrudes from a top surface of the cap and then form as a mark.

\* \* \* \* \*